United States Patent [19]
Darbesio

[11] Patent Number: 5,194,756
[45] Date of Patent: Mar. 16, 1993

[54] VEHICLE PROVIDED WITH AN IMPROVED SYSTEM FOR CONTROLLING THE WINDOW AND SUNROOF MOVEMENT AND DOOR LOCKS

[75] Inventor: Luigi Darbesio, Orbassano, Italy
[73] Assignee: Fiat Auto S.p.A., Turin, Italy
[21] Appl. No.: 902,408
[22] Filed: Jun. 19, 1992

Related U.S. Application Data

[63] Continuation of Ser. No. 433,570, Nov. 8, 1989, abandoned.

[30] Foreign Application Priority Data

Nov. 8, 1988 [IT] Italy .................. 67994 A/88

[51] Int. Cl.$^5$ .............................................. B60R 25/00
[52] U.S. Cl. ................................ 307/10.2; 180/287; 180/289; 307/10.1
[58] Field of Search ............... 307/9.1, 10.1, 38, 39, 307/592, 112, 115, 116; 361/139, 160, 170; 296/146, 147; 280/72.7; 318/139, 266, 484; 49/24, 32, 136; 180/287, 289

[56] References Cited

U.S. PATENT DOCUMENTS

| | | | |
|---|---|---|---|
| 2,621,037 | 12/1952 | Riedel | 268/20 |
| 3,937,976 | 2/1976 | McGuirk, Jr. | 307/10.2 |
| 4,683,975 | 8/1987 | Booth et al. | 180/289 |
| 4,701,629 | 10/1987 | Citroën | 307/10.1 |
| 4,709,196 | 11/1987 | Mizuta | 318/282 |
| 4,864,153 | 9/1989 | McIntosh, Jr. | 307/10.1 |
| 4,883,974 | 11/1989 | Tinder | 307/10.1 |
| 4,887,263 | 12/1989 | Steely | 370/85.1 |

FOREIGN PATENT DOCUMENTS

| | | |
|---|---|---|
| 0175832 | 4/1986 | European Pat. Off. . |
| 3514223 | 10/1986 | Fed. Rep. of Germany . |
| 2525271 | 10/1983 | France . |
| 1089026 | 11/1967 | United Kingdom . |
| 2199963 | 7/1988 | United Kingdom . |

*Primary Examiner*—A. D. Pellinen
*Assistant Examiner*—David Osborn
*Attorney, Agent, or Firm*—Frost & Jacobs

[57] ABSTRACT

The vehicle is provided with a system able to simultaneously control all the mobile closure elements (windows installed in the doors, and possible sunroof). The system is conveniently activated by a switch element installed in the vehicle passenger compartment, and/or by the centralized vehicle door locking device. The system can simultaneously close all windows and a sunroof by the actuation of a switch while the ignition switch Is is turned on. The system can simultaneously close all windows and a sunroof, and additionally lock all the doors, by the continuous actuation of a different switch (either K1 or K2) for more than two seconds if the ignition switch is not turned on.

10 Claims, 4 Drawing Sheets

VEHICLE PROVIDED WITH AN IMPROVED SYSTEM FOR CONTROLLING THE WINDOW AND SUNROOF MOVEMENT AND DOOR LOCKS

This is a continuation of application Ser. No. 07/433,570, filed Nov. 8, 1989 abandoned.

BACKGROUND OF THE INVENTION

This invention relates to a vehicle provided with an improved system for controlling the window and sunroof movement. Numerous vehicles are known provided with systems for controlling the movement of the door-installed windows and of the possible sunroof.

The windows and sunroof are generally operated by two different systems which besides increasing overall cost do not totally satisfy the requirements of the driver. For example the driver may wish to automatically raise or lower windows either with the ignition key switched on (and thus presumably with the vehicle in motion) or with the ignition key switched off (and the vehicle ready to be left parked).

In these respects, current systems do not allow the driver's requirements to be totally satisfied. For example, if the ignition key is switched off it is not possible to close the windows, with the result that it is often necessary to reopen the door, switch on the ignition key and operate the closure buttons should the driver not have realized in time that some of the door windows or the sunroof have been left open by mistake.

SUMMARY OF THE INVENTION

The object of the present invention is to provide a vehicle comprising an system for controlling the window and possible sunroof movement which is simple to use, satisfies the aforesaid operating requirements and is of low cost compared with that of the aforesaid current systems.

Said object is attained according to the present invention by a vehicle of the type provided with a system comprising a plurality of operating elements, each of which is associated with a respective mobile closure element (sliding window installed in a door and/or sunroof), characterised in that said system comprises:
central control means able to simultaneously control the movement of all said operating means; and
command means operated by a single action performed inside and/or outside the vehicle.

BRIEF DESCRIPTION OF THE DRAWINGS

The present invention will be more apparent from the description of a preferred embodiment given hereinafter by way of non-limiting example with reference to the accompanying drawings in which.

DETAILED DESCRIPTION OF THE INVENTION

Figure 1:
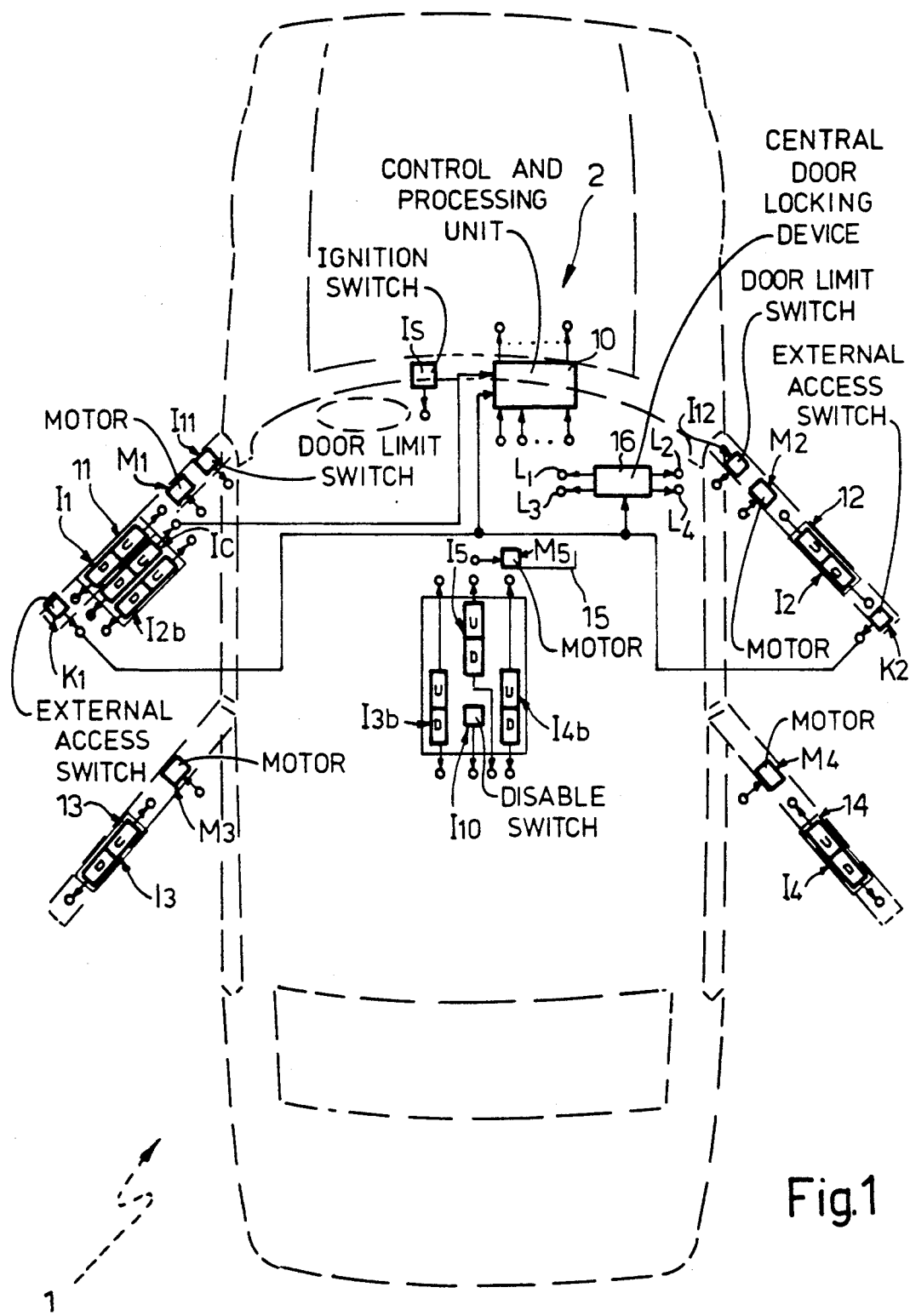
FIG. 1 is a diagrammatic plan view of a vehicle provided with a system constructed in accordance with the present invention.

In FIG. 1 the reference numeral 1 indicates overall a vehicle provided with a system 2 constructed in accordance with the present invention for controlling the movement of the windows and sunroof (not shown).

The system 2 comprises essentially a plurality of electric motors M1, M2, M3, M4, M5, constituting the operating elements, each of which is installed respectively in a door 11, 12, 13, 14 or in a fixed part of the roof of the vehicle 1, for the purpose of moving the said respective window or sunroof.

The system 2 is also provided with a plurality of switch elements, the reference numerals and positions of which are listed hereinafter.

Specifically, the switches I1, Ic, I2b are carried by the door 11 on the driver's side and have the following respective functions:
I1—to cause movement of the windows installed in the door 11;
Ic—to cause simultaneous opening or closure of all the windows and the sunroof;
I2b—to cause movement of the window installed in the door 12.

The switches I2, I3, I4 are carried by the doors 12, 13, 14 respectively and cause movement of the windows installed in these doors.

The switches I3b, I4b, I10 are carried in an intermediate position between the two front seats and the switch I5 is conveniently carried on the roof lamp, these respectively performing the following functions:
I3b, I4b—to cause movement of the windows installed in the respective doors 13, 14;
I5—to cause movement of the sunroof;
I10—to disable the operation of the switches I3, I4.

All the aforesaid switches with the exception of I10 are of the type comprising two operating positions and one rest position, to allow the windows and sunroof to be moved towards a raised or closed position (the respective portion to be pressed being indicated by V for each switch), or towards a lowered or open position (the respective portion to be pressed being indicated by D for each switch).

The system 2 is also provided with a control and processing unit 10 to which all the terminals of the said motors and three-position switches and possibly of the switch I10 are connected (in a manner not shown).

In addition to the said terminals, the unit 10 is also connected to a terminal of a switch Is operated by the driver by means of the ignition key of the vehicle 1, and the terminals of two switches I11, I12 installed in the opening occupied by the doors 11 and 12 respectively, to light the passenger compartment lights each time at least one of said front doors is opened.

Finally, the input of the unit 10 is connected to a terminal of a centralized door locking device 16 for door locking mechanisms L1, L2, L3, L4 of the vehicle 1 which receives activation signals from switches K1, K2 installed in the doors 11, 12 respectively in a position accessible from the outside.

Figure 2:
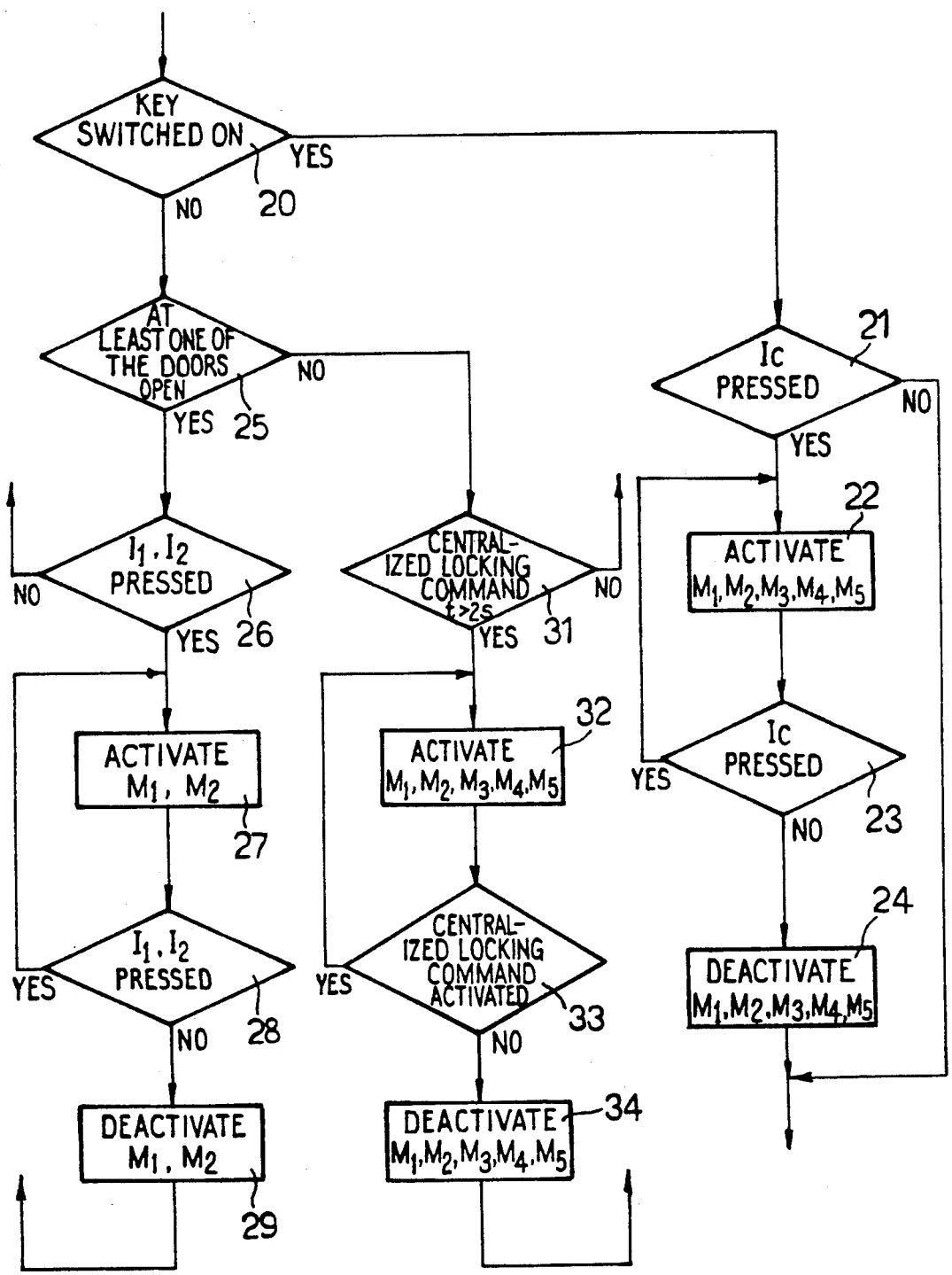
FIGS. 2, 3 and 4 are flow diagrams of preferred embodiments of a main program for an arithmetic processing unit pertaining to the system of FIG. 1.

The operation of the system 2 is described hereinafter with particular reference to FIGS. 2, 3, 4 which as stated represent the flow diagrams of preferred embodiments of a main program for the processing unit 10.

The program commences with a comparison block 20 which checks the state of the switch Is to evaluate whether the ignition key for the vehicle engine is switched on or not.

If the result is positive the program passes to a further comparison block 21 which checks the state of the switch Ic. If this switch has not been pressed it passes to subsequent operations described with reference to FIGS. 3 and 4. If instead the switch Ic has been pressed the program passes to a command block 22 which causes the motors M1, M2, M3, M4, M5 to rotate in one or other direction depending on whether the portion V or the portion D of the switch Ic has been pressed.

Consequently all the windows and the sunroof of the vehicle 1 are simultaneously raised or lowered.

The program then passes to a comparison block 23 which checks whether the switch Ic is still pressed. If the result is positive it returns to the block 22 to keep said motors activated. If negative the program passes to a block 24 which deactivates all the motors to interrupt the raising or lowering of the windows as soon as the driver ceases to press the switch Ic.

Returning to the block 20, if the key has not been switched on the program passes to a comparison block 25 which checks the state of the switches I11, I12 to determine whether at least one of the doors 11, 12 is open.

If the result of this check is positive the program passes to a block 26 which checks whether one or both of the switches I1, I2 have been pressed. If so, the program passes to three blocks 27, 28, 29 which in known manner keep the respective motors (M1, M2) operating while the respective switches (I1, I2) remain pressed, to enable the windows of the doors 11, 12 to be closed or opened as required by the driver.

If both the doors 11, 12 are closed, the program passes from the block 25 to a comparison block 31 which checks the state of the signal from the centralized locking device 16 to measure whether the duration of the command time for this locking exceeds a predetermined time period (for example 2 seconds). If the duration is less than 2 seconds the program returns to the block 20. If the duration exceeds 2 seconds all the motors M1, M2, M3, M4, M5 are activated to simultaneously close all the windows and the sunroof for the entire time period during which the centralized locking command remains active. This is done by the blocks 32, 33, 34, following a procedure of known type analogous to that described with reference to the blocks 27, 28, 29. With reference to FIG. 3, the operation of the motor M1 will now be examined following the command generated by the respective switch I1. I1V indicates that the portion V, of the switch I1 has been pressed, whereas I1D indicates that its portion D has been pressed; likewise M1V indicates that the motor M1 has been enabled to raise the window of the door 11, whereas M1D indicates that it has been enabled to lower this window.

On this basis, a comparison block 40 is reached which checks whether the switch portion I1V or I1D is pressed for a time period t<0.3s.

If the result is positive, an automatic closure or opening procedure commences for the window of the door 11 and, unless prior action is taken, concludes when the end-of-travel position of the window is reached, on which the motor M1V, M1D is deactivated. This is done by means of the block 41 which activates the motor M1V, M1D, the block 42 which checks whether the end-of-travel position has been reached, the block 43 which deactivates said motor when said end-of-travel position is reached, and the block 44 which checks whether during the movement of the window that switch portion I1D, I1V has been pressed which would cause the window to travel in the other direction to that in which it is currently travelling.

If this latter situation has occurred and in addition the relative switch has been operated for a period of less than 0.3 seconds, which is checked by the block 45, the electric motor M1 is immediately deactivated by the block 43, to that the window remains at rest in the position which it has assumed at that instant.

If the switch is operated for a time period exceeding 0.3 seconds, the direction of movement of the window is reversed for the entire time during which the respective portion I1D, I1V of the switch I1 remains pressed. This is done by the blocks 46, 47, 48 in a known manner analogous to that described with reference to the blocks 27, 28, 29 of FIG. 2.

Returning now to the block 40 and assuming that the switch I1 is pressed for a time period $t > 0.3$ seconds, a manual raising or lowering procedure is implemented to cause the window to rise or descend only for the time period for which the respective switch portion (I1V, I1D) is pressed. Again in this case the procedure is implemented by three blocks 51, 52, 53 in the manner described with reference to said blocks 46, 47, 48.

Figure 4:
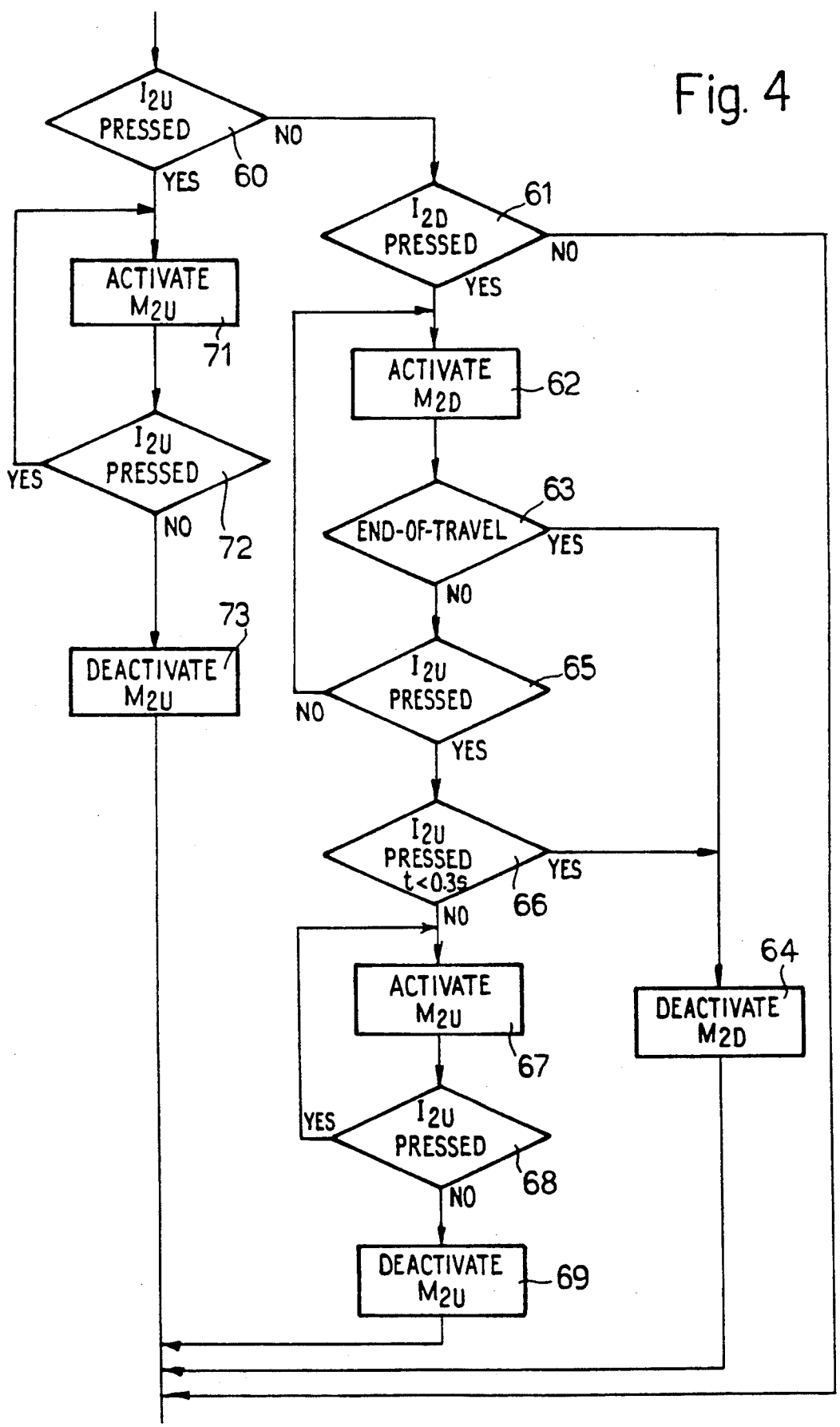

With reference to FIG. 4, the behaviour of the motor M2 will now be examined on the basis of the commands generated by the switch I2 in its two possible working positions (I2V, I2D). It should be noted that the behaviour of the motors M3, M4 is substantially identical to the behaviour of the motor M2 except for certain differences which are detailed hereinafter.

A pair of comparison blocks 60, 61 are firstly reached, their purpose being to identify which of the portions (I2V or I2D) of the switch I2 has been pressed.

If neither has been pressed, there is obviously no command required for moving the windows associated with the motor M2, and the program proceeds to carry out the same check on the switches I3, I4.

If it is found that the portion I2D has been pressed, an automatic lowering procedure for the window associated with the motor M2 is implemented which is entirely analogous to that described with reference to FIG. 3. Specifically, the blocks 62, 63, 64, 65 of FIG. 4 perform the same functions as those described for the blocks 41, 42, 43, 44 of FIG. 3.

There is again the facility for interrupting the automatic lowering of the window and, if required, to initiate manual raising as described with reference to FIG. 3. In this respect, the blocks 66, 67, 68, 69 of FIG. 4 perform the same functions as the blocks 45, 46, 47, 48 of FIG. 3 respectively.

Figure 3:
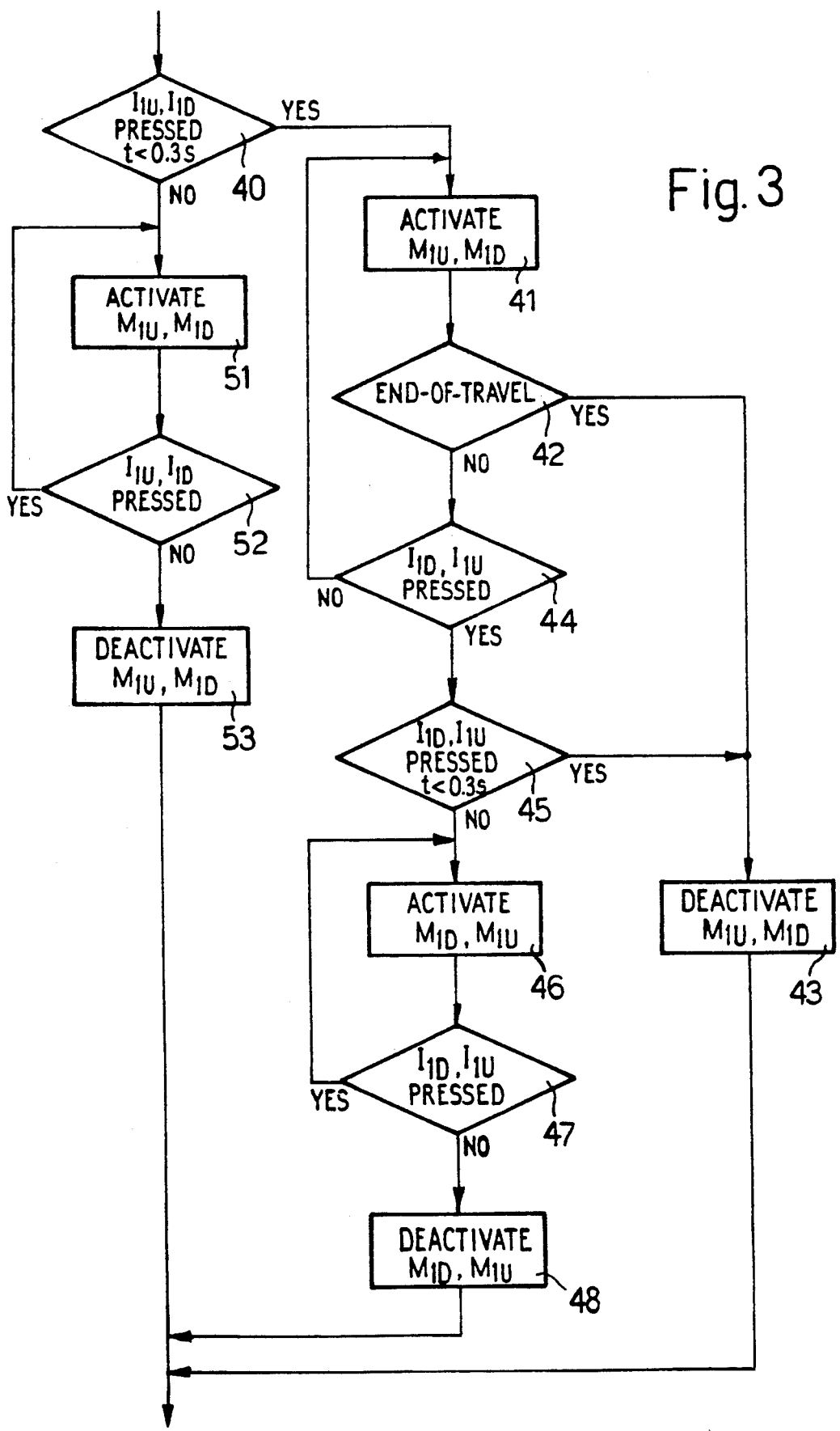

Finally, if the switch portion I2V has been pressed, a manual raising procedure for the respective window is initiated, with an operating sequence involving the control of information through the blocks 71, 72, 73, the function performed by these being totally analogous to that of the blocks 51, 52, 53 of FIG. 3. To complete the aforesaid, and with particular reference to the switches I2b, I3b, I4b, it should be noted that if the driver and passenger give opposing commands, the descent command will always prevail.

Moreover, the switches I3b and I4b are always in the enabled state when the ignition key is switched on, even if the switch I10 has been operated, the purpose of this latter being merely to inhibit operation of the switches I3 and I4.

Finally, in a manner not shown, those switches which are able to operate (i.e. those which have not been disenabled) are lit by an illumination element (such as a light-emitting diode), whether the ignition key has been switched on or not.

The advantages of the present invention are apparent from an examination of its characteristics.

Firstly, the windows and sunroof are operated by a single system, thus simplifying the handling of the commands and reducing overall construction and installation costs.

In addition the facility for simultaneously opening or closing from the inside and closing from the outside all the windows and the possible sunroof further enhances the use of the system according to the present invention.

Finally, it is apparent that modifications can be made to the system 2 but without leaving the scope of the present invention. For example, the command for closing all the closure elements (windows and sunroof) of the vehicle 1 could be provided by a remote control device of known type, provided the concept of operating the remote control device for a time period exceeding a given value is unchanged.

I claim:

1. A vehicle having doors provided with a control system comprising:
    an ignition switch having on and off positions;
    a plurality of operating elements, each of which is associated with a respective mobile closure element;
    a central controller connected to said operating elements, said central controller being able to simultaneously control the movement of all said operating elements;
    a central door locking command device for the centralized locking of the doors of said vehicle, said central door locking command device being operable from outside the vehicle and including first switch elements installed in the front doors of said vehicle, said first switch elements connected to said central door locking command device and to said central controller;
    said central controller being provided with processing means for comparing the duration of operation of said first switch elements with a first predetermined time period, and for causing said mobile closure elements to close by means of said operating elements each time said duration of operation exceeds said first predetermined time period, if the ignition switch is not in the on position;
    a plurality of second switch elements installed in the front doors of said vehicle, said second switch elements connected to said central controller;
    said central controller being provided with processing means for comparing the duration of operation of each of said second switch elements with a second predetermined time period if the ignition switch is in the on position, and for causing at least a portion of said mobile closure elements to either
    (a) automatically open or close if the duration of operation of one of the second switch elements fails to exceed the second predetermined time period, or
    (b) open or close under manual control if the duration of operation of one of the second switch elements exceeds the second predetermined time period;
    said central controller further controlling at least a portion of said mobile closure elements as they automatically open or close as each of the mobile closure elements continues to open or close until it reaches its end travel, unless an associated second switch element is actuated in a direction opposite to the then occurring movement of the mobile closure elements, wherein:
    (a) the mobile closure elements stop movement at mid-travel if the duration of operation in the opposite direction of the associated second switch element fails to exceed a third predetermined time period; and
    (b) the mobile closure elements reverse direction of movement if the duration of operation in the opposite direction of the associated second switch element exceeds said third predetermined time period.

2. A vehicle as claimed in claim 1, characterised in that said central door locking command device operable from the inside comprises a portion of said second plurality of switch elements provided with two operative portions conveniently installed in said vehicle in a position easily accessible from the driving seat.

3. A vehicle as claimed in claim 1, characterised in that said portion of said second plurality of switch elements is installed in the door adjacent to said driving seat.

4. A vehicle as claimed in claim 1 comprising a third plurality of switch elements which duplicate the second plurality of switch elements which are installed in the rear doors of said vehicle; said third plurality of switch elements being installed in an intermediate position between the front seats of said vehicle.

5. A vehicle as claimed in claim 4, comprising means for disabling actuation of said second plurality of switch elements which are installed in said rear doors.

6. A vehicle as claimed in claim 5, characterised in that said means for disabling actuation of said second plurality of switch elements which are installed in said rear doors comprises a fourth switch element conveniently installed between said front seats of said vehicle.

7. A vehicle as claimed in claim 1, further comprising a plurality of door locking mechanisms which are connected to said central door locking command device, and wherein said door locking mechanisms are activated to lock the doors of the vehicle when the duration of operation of said second plurality of switch elements exceeds said predetermined time period, if the ignition switch is not in the on position.

8. A method for controlling windows and locks of a vehicle, comprising the steps of:
    (a) providing an ignition switch having on and off positions;
    (b) providing a plurality of operating elements, each of which is associated with a respective mobile closure element;
    (c) simultaneously controlling the movement of said operating elements by use of a central controller;
    (d) locking all doors of said vehicle by use of a central door locking command device, said central door locking command device being operable from outside the vehicle and including first switch elements installed in the front doors of said vehicle;
    (e) comparing the duration of operation of said first switch elements with a first predetermined time period by use of processing means within said central controller, and causing said mobile closure elements to close by means of said operating elements each time said duration of operation exceeds said first predetermined time period, if the ignition switch is not in the on position;
    (f) comparing the duration of operation of each of a plurality of second switch elements, which are installed in the front doors of said vehicle, with a second predetermined time period if the ignition switch is in the on position, and causing at least a portion of said mobile closure elements to either (1) automatically open or close if the duration of operation of one of the second switch elements fails to exceed the second predetermined time period, or (2) open or close under manual control if the duration of operation of one of the second switch elements exceeds the second predetermined time period;

(g) controlling at least a portion of said mobile closure elements as they automatically open or close as each of the mobile closure elements reaches its end travel, unless an associated second switch element is actuated in a direction opposite to the then occurring movement of the mobile closure elements, wherein:

(1) the mobile closure elements stop movement at mid-travel if the duration of operation in the opposite direction of the associated second switch element fails to exceed a third predetermined time period; and (2) the mobile closure elements reverse direction of movement if the duration of operation in the opposite direction of the associated second switch element exceeds said third predetermined time period.

9. A method for controlling windows and locks of a vehicle as recited in claim 8, wherein said mobile closure elements comprise the door windows of said vehicle.

10. A method for controlling windows and locks of a vehicle as recited in claim 8, further comprising the step of providing a plurality of third switch elements, located in the rear doors of said vehicle, which can actuate at least a portion of said mobile closure elements to open or close, unless a means for disabling said plurality of third switch elements has been actuated. b

* * * * *

UNITED STATES PATENT AND TRADEMARK OFFICE
CERTIFICATE OF CORRECTION

PATENT NO. : 5,194,756
DATED : March 16, 1993
INVENTOR(S) : Luigi Darbesio

It is certified that error appears in the above—identified patent and that said Letters Patent is hereby corrected as shown below:

In column 6, line 17, [claim 3], "1" should read --2--.

In column 8, line 18, [claim 10], "b" should be deleted.

Signed and Sealed this

Fifteenth Day of March, 1994

Attest:

BRUCE LEHMAN

*Attesting Officer*  *Commissioner of Patents and Trademarks*